(12) United States Patent
Ding

(10) Patent No.: US 8,576,464 B2
(45) Date of Patent: Nov. 5, 2013

(54) IMAGE CAPTURING DEVICE HAVING IMPROVED BRIDGE STRUCTURE

(75) Inventor: Raymond Ding, Xinyu (CN)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 71 days.

(21) Appl. No.: 13/402,935

(22) Filed: Feb. 23, 2012

(65) Prior Publication Data

US 2013/0148174 A1 Jun. 13, 2013

(30) Foreign Application Priority Data

Dec. 7, 2011 (CN) ...................... 2011 2 0504003 U

(51) Int. Cl.
*H04N 1/04* (2006.01)
(52) U.S. Cl.
USPC ............ 358/498; 358/474; 358/497; 358/496
(58) Field of Classification Search
USPC .................. 358/498, 474, 497, 496
See application file for complete search history.

(56) References Cited

U.S. PATENT DOCUMENTS

2012/0206777 A1* 8/2012 Konishi et al. ................ 358/474

* cited by examiner

*Primary Examiner* — Houshang Safaipour
(74) *Attorney, Agent, or Firm* — Li & Cai Intellectual Property (USA) Office

(57) ABSTRACT

A detecting device having image capturing capability in a bridge structure is provided, which includes a housing, a bridge structure, a scanning module, and a slider. The housing has a plurality of inner walls. The bridge structure includes at least one roller, an ADF transparent layer, and a flatbed transparent layer. The roller is arranged on one of the inner walls between the ADF transparent layer, and the flatbed transparent layer. The scanning module is movably arranged below the ADF transparent layer, and the flatbed transparent layer. The scanning module and the roller are spaced apart from each other. The slider is arranged on the scanning module, where the slider has a glide plane arranged proximate to the ADF transparent layer, and the flatbed transparent layer. The roller rolls on the glide plane. Thus, the lifespan of the device may be extended through reduction of friction during scanning operation.

10 Claims, 8 Drawing Sheets

RPIOR ART

IMAGE CAPTURING DEVICE HAVING IMPROVED BRIDGE STRUCTURE

BACKGROUND OF THE INVENTION

1. Field of the Invention

The instant disclosure relates to an image detecting/capturing device; in particular, to an image detecting/capturing device of contact image sensor (CIS) type having an improved bridge structure.

2. Description of Related Art

Conventional image scanners that utilize contact image sensors (CIS) for image formation (such as the scanner 1a shown in FIG. 1) include a housing 11a, an automatic document feeder (ADF) window 12a, a flatbed window 13a, a bridge plate 14a, a CIS scanning module 15a, and a slider 16a. The bridge plate 14a is arranged in the housing 11a between the ADF window 12a and the flatbed window 13a.

Generally, in order to meet the demand for mass production under current technology constrains, the ADF window 12a and the flatbed window 13a have to be arranged as separate components. The scanning module 15a has to travel back and forth between the separately arranged ADF window 12a and the flatbed window 13a in order to perform the scanning ability. Due to the fragile nature of glasses (which can be easily broken), drilling a trough on the glasses without breaking it is difficult and impractical. Thus, it is not easy and suitable to manufacture the ADF window 12a and the flatbed window 13a as a single integrated glass structure.

Therefore, a bridge structure (such as a bridge plate 14a) suitable for the scanning module 15a to pass through is required between the ADF window 12a and the flatbed window 13a. As the CIS scanning module 15a has a shallow depth of field, the scanning module 15a has to be in close contact with the glass surface and the bridge plate 14a surface during operation. When the slider 16a loaded on the scanning module 15a glides over the bridge plate 14a, a surface of the slider 16a comes in contact with the bridge plate 14a. After prolong usage, abrasive damage may be caused on the slider 16a and the bridge plate 14a due to friction, consequently shortening the lifespan of the scanner 1a, reducing the graphic quality, and producing unwelcomed noise during operation.

To address the above issues, the inventor strives via industrial experience and academic research to present the instant disclosure, which can effectively improve the limitations described above.

SUMMARY OF THE INVENTION

The object of the instant disclosure is to provide an image detecting/capturing device having an improved bridge structure. When the scanning module passes through the bridge structure, the slider will be moved on a roller to reduce the frictional resistance therebetween which will lead to abrasion, thus, increasing the lifespan of the device and maintaining the image quality in a better condition.

In order to achieve the aforementioned objects, according to an embodiment of the instant disclosure, an image detecting/capturing device having an improved bridge structure is provided. The detecting/capturing device includes a housing, a bridge structure, a scanning module and a slider, where the housing has a plurality of inner walls. The bridge structure includes at least one roller, an ADF transparent layer, and a flatbed transparent layer. The roller is mounted on one of the inner walls of the housing, between the ADF transparent layer and the flatbed transparent layer. With the orientation of the figures, the scanning module is movably arranged below the ADF transparent layer and the flatbed transparent layer, where the scanning module and the roller are spaced apart from each other. The slider is arranged on the scanning module, and the slider has a glide plane arranged proximate to the ADF transparent layer and the flatbed transparent layer. Furthermore, the roller can roll on the glide plane.

Based on the above, an image detecting/capturing device having an improved bridge structure is provided. The ADF transparent layer and the flatbed transparent layer have a roller mounted therebetween. The roller rotates swiftly to ensure a smooth operation of the scanning module between the ADF transparent layer and the flatbed transparent layer. Furthermore, the slider is moved by the rotation of the roller which has well replaced the typical sliding manner. Therefore, the frictional resistance therebetween can be decreased significantly to reduce damages to the slider from friction. Thus, the lifespan of the detecting device can be lengthened and the quality of the graphic can be maintained permanently in a better condition. On the other hand, in comparison to conventional bridge plates, the inclusion of the roller can simplify the structural design of the detecting device to reduce the manufacturing cost.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Unless stated otherwise, all mentioned quantities are not intended to be limiting.

Figure 1:
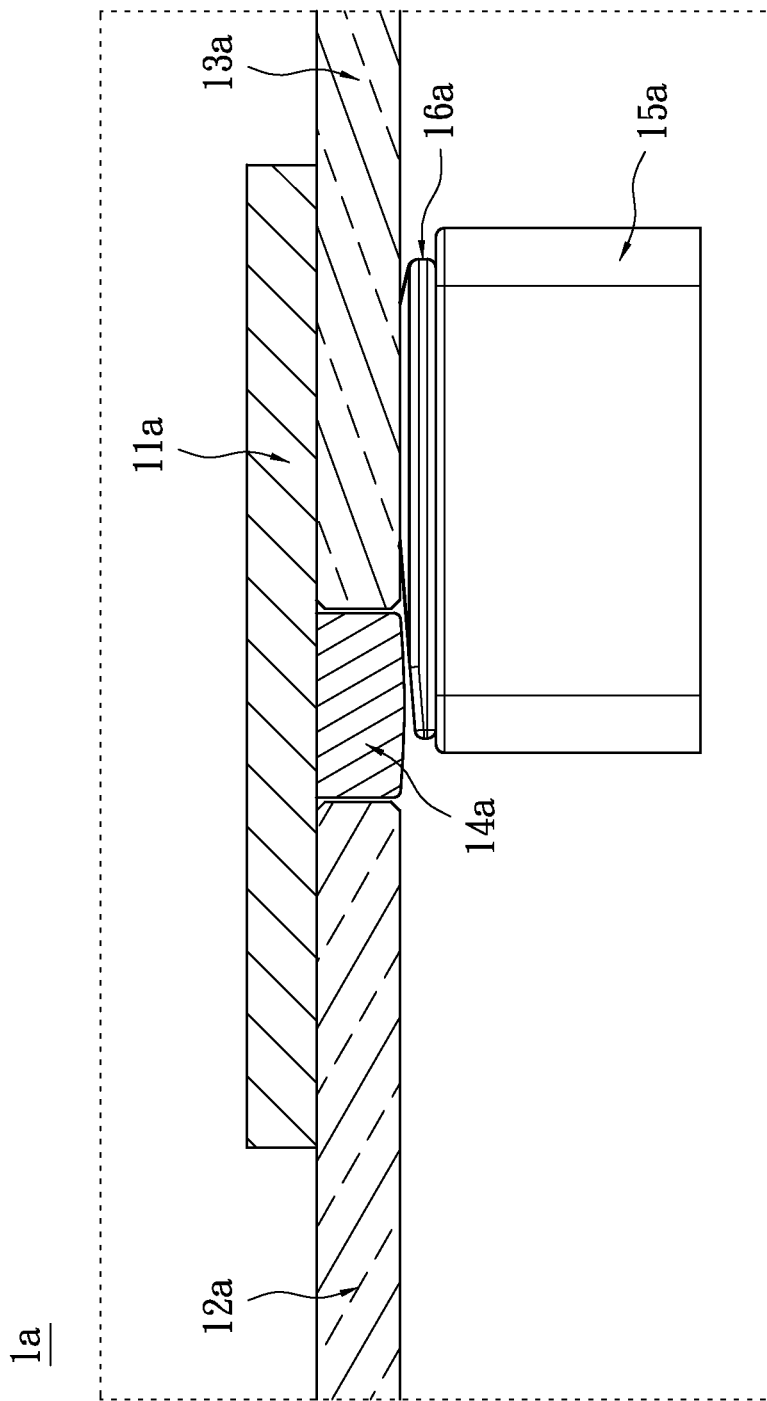
FIG. 1 shows a perspective view of a CIS scanner according to the prior arts.
Figure 2:
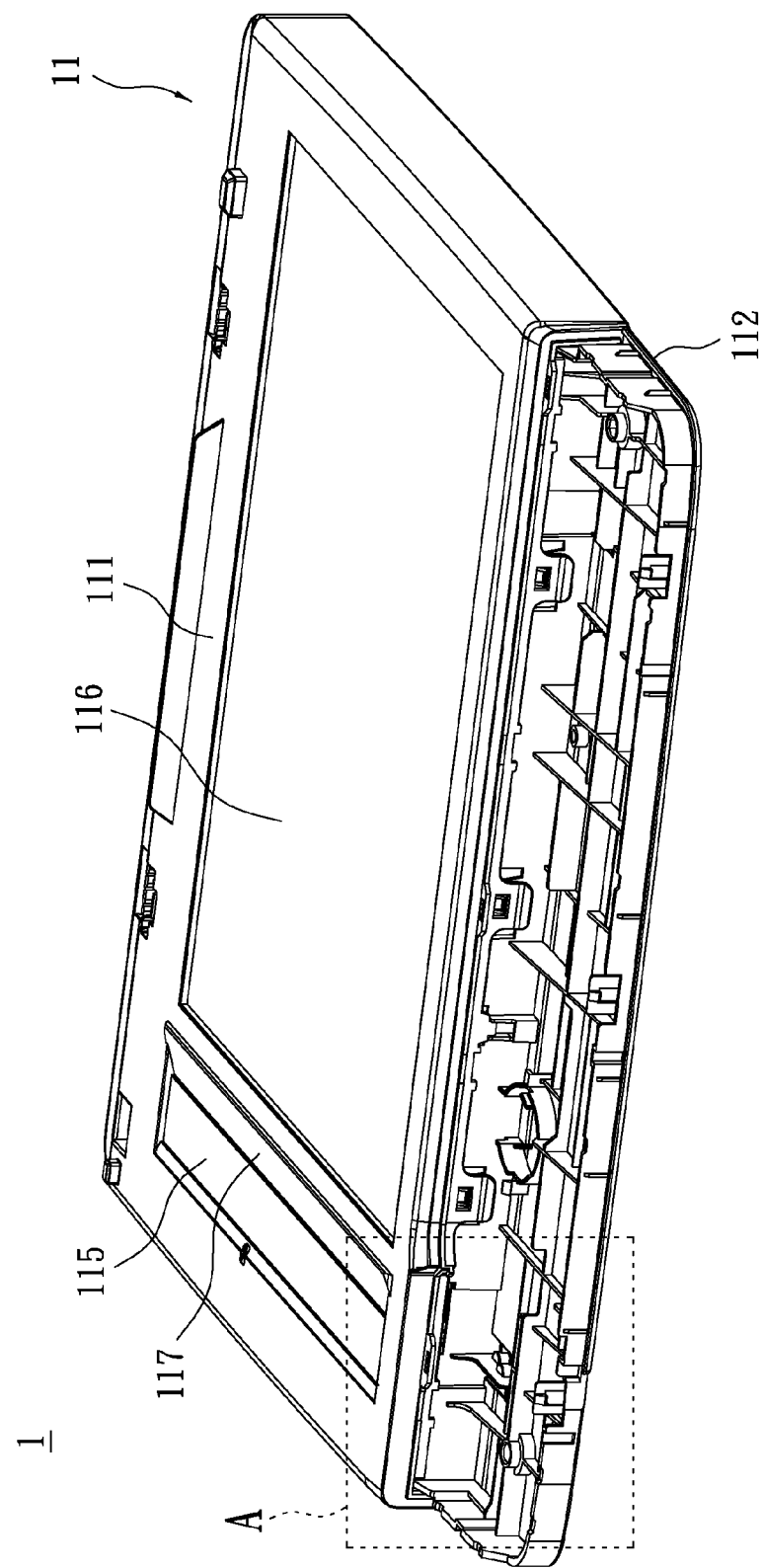
FIG. 2 shows a three-dimensional view of a detecting device having image capturing capability in a bridge structure, according to the instant disclosure.
Figure 3:
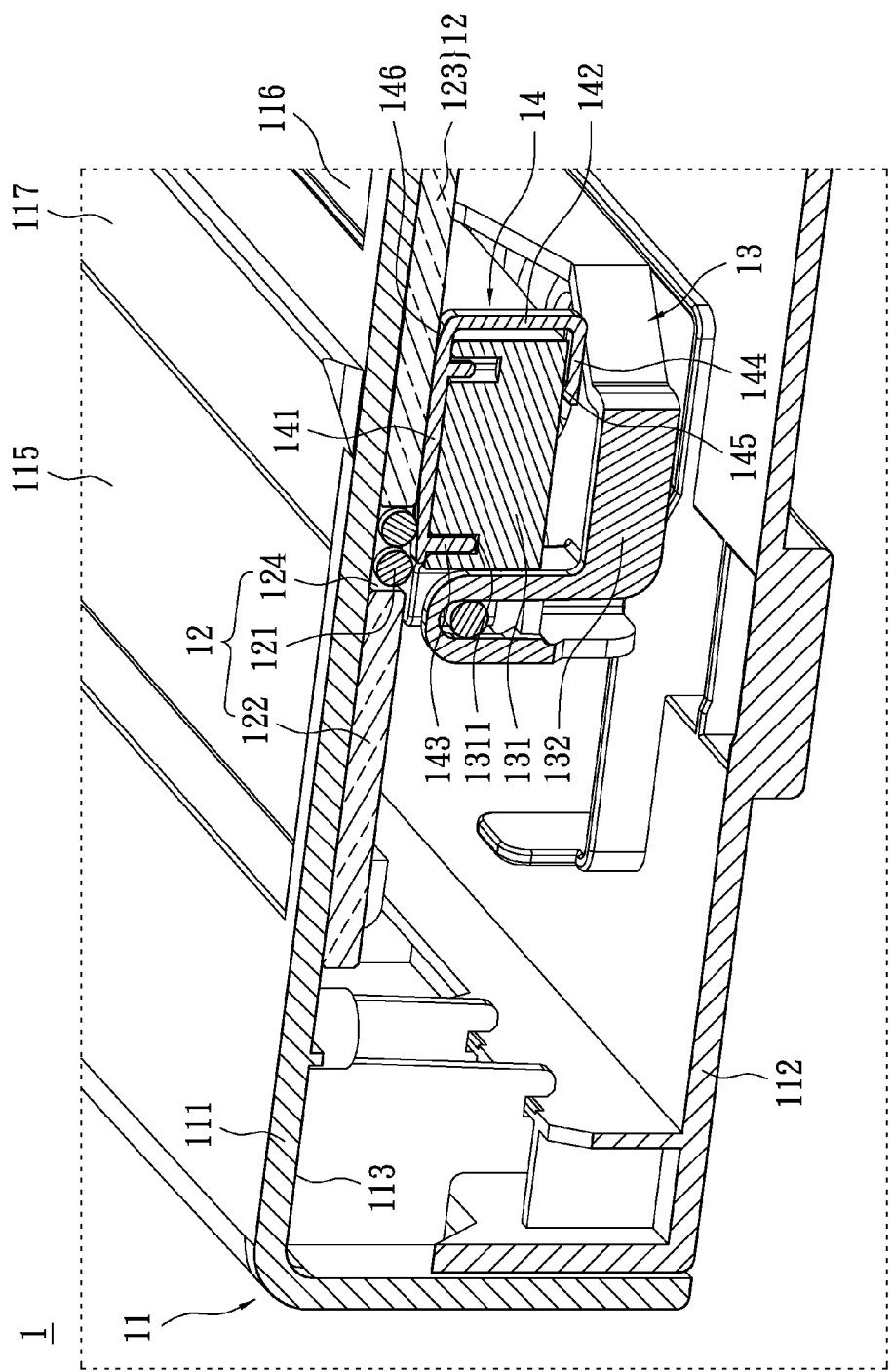
FIG. 3 shows a three-dimensional cross-sectional view of the portion A of FIG. 2 according to the instant disclosure.
Figure 4:
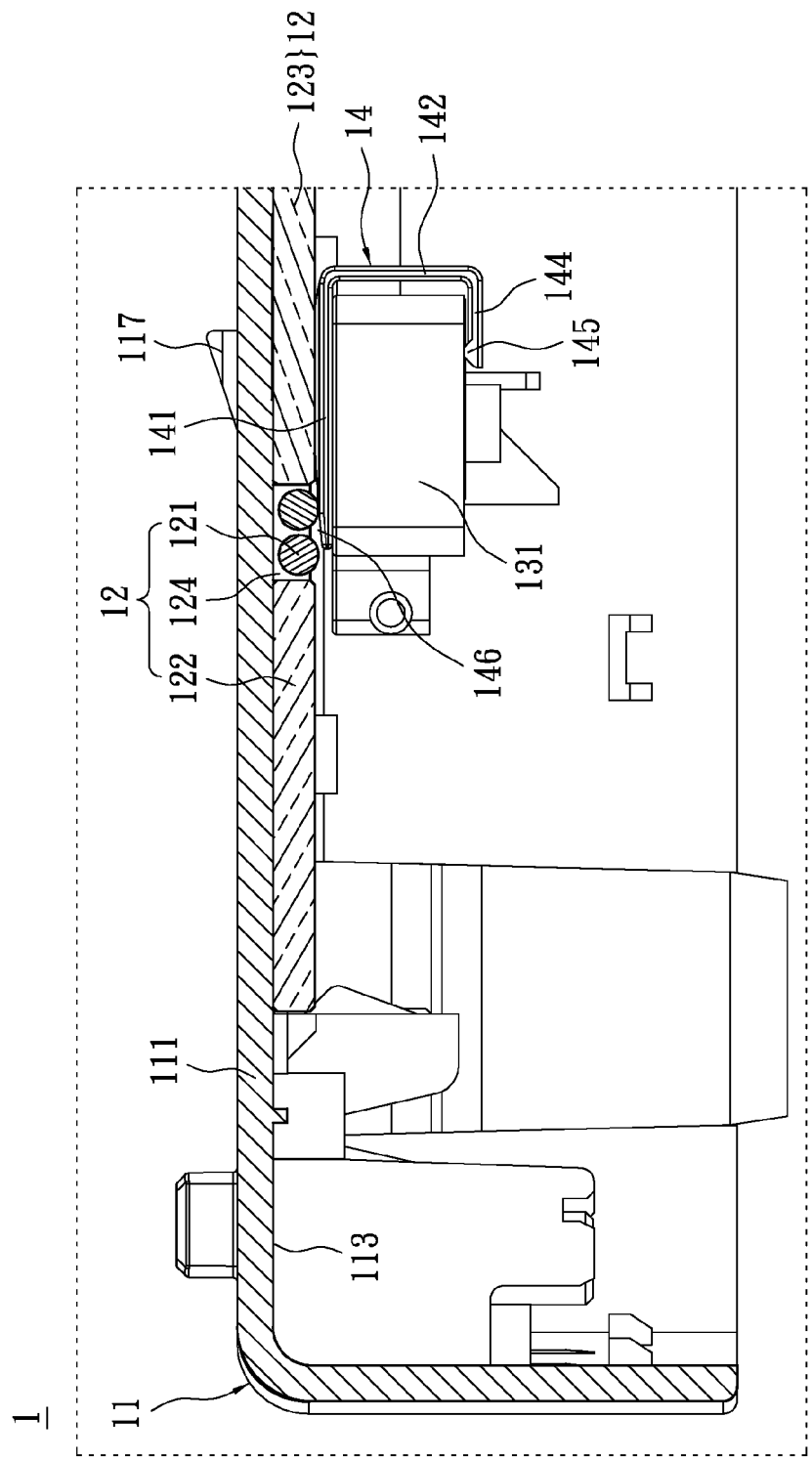
FIG. 4 shows a cross-sectional side view of the portion A of FIG. 2 according to the instant disclosure.

Please refer to FIGS. 2-4. An embodiment of the instant disclosure discloses an image detecting/capturing device 1 having an improved bridge structure. The detecting device 1 refers particularly to a scanner that utilizes contact image sensor (CIS) for image formation, which has a shallower depth of field. The CIS is a highly modularized component which may include an optical lens assembly and an electro-optical converting device. The CIS is commonly applied on scanners with thinner housings and quick switch-on functions.

The detecting device 1 includes a housing 11, a bridge structure 12, a scanning module 13 and a slider 14. The housing 11 has a cover 111 and a base 112, and is formed of the assembly of the cover 111 and the base 112. To provide further explanations, the cover 111 and the base 112 of the instant embodiment are two detachable components; however, the housing 11 can also be formed as a single unit, where the structural design of the housing 11 is not restricted thereto. The cover 111 and the base 112 of the housing 11 have a plurality of inner walls 113 therein respectively, and the bridge structure 12 is arranged proximate to the cover 111. The housing 11 has an ADF window 115, and a flatbed window 116, where they are spaced apart by a dividing portion 117 arranged therebetween.

The bridge structure 12 includes at least one roller 121, an ADF transparent layer 122, and a flatbed transparent layer 123. The ADF transparent layer 122 is exposed to the surrounding through the corresponding ADF window 115; similarly, the flatbed transparent layer 123 is exposed to the surrounding through the corresponding flatbed window 116. The scanning module 13 is spaced apart from the roller 121, where the roller 121 acts as a bridge structure between the ADF transparent layer 122 and the flatbed transparent layer 123. The instant embodiment utilizes two rollers 121 to form a roller assembly for example, however, the quantity of the rollers 121 is not restricted thereto.

A gap 124 is maintained between the ADF transparent layer 122 and the flatbed transparent layer 123. The rollers 121 are rotatably arranged in a fixed point on an inner wall 113 of the housing 11, proximate to the ADF window 115. Specially, the rollers 121 are arranged in the gap 124 between the ADF transparent layer 122 and the flatbed transparent layer 123.

Please note that the rollers 121 of the instant disclosure are spaced clear from the inner walls 113 of the cover 111 in such a way that, when the rollers 121 rotate about a fixed point, the rollers 121 will not contact the inner walls 113 of the cover 111. In addition, a predetermined distance is kept between the rollers 121 and the ADF transparent layer 122, and the flatbed transparent layer 123 respectively. Similarly, the rollers 121 which are arranged to rotate in a fixed point, do not get in contact with the adjacent surfaces of the ADF transparent layer 122 and the flatbed transparent layer 123. Thus, the rollers 121 can rotate more swiftly. To provide further explanations, the ADF transparent layer 122 and the flatbed transparent layer 123 are preferably made of glass materials; however, any material with high clarity and strong supporting capabilities are also most applicable. Therefore, all simple variations of the materials applied, belong to the claim coverage of the instant disclosure.

Please refer to FIGS. 3-4. The scanning module 13 is movably arranged in close contact, below the ADF transparent layer 122 and the flatbed transparent layer 123. The scanning module 13 may move between the ADF window 115 and the flatbed window 116 during operation, and can perform scanning function through both the ADF window 115 and the flatbed window 115.

The slider 14 is arranged on the scanning module 13. The slider 14 has a first portion 141 and a second portion 142, where the first and the second portions 141, 142 are connected in their respective ends. As shown in FIG. 4, the slider 14 is substantially an L-shaped structure. The first portion 141 has at least one first extended portion 143 which extends to form in the direction away from the rollers 121. Moreover, the direction of extension of the first extended portion 143 is preferably vertically toward the scanning module 13. One end of the second portion 142 has a second extended portion 144 extended therefrom, where the second extended portion 144 is arranged in parallel with respect to the first portion 141. One distal end of the second extended portion 144 has a nail portion 145 arranged thereon, where the nail portion 145 is extendedly formed in the direction facing the first portion 141.

The first portion 141 of the slider 14 has a glide plane 146 proximate to the ADF transparent layer 122 and the flatbed transparent layer 123. The rollers 121 can roll on the glide plane 146, and the minimum distance between the rollers 121 and the glide plane 146 is maintained zero. In other words, when the scanning module 13 passes through the gap 124, the glide plane 146 will abut against the rollers 121 continuously. During the operation of the scanning module 13 below the ADF transparent layer 122 and the flatbed transparent layer 123 to move therebetween, if the slider 14 moves in a favorable direction sequentially through the ADF transparent layer 122, the rollers 121, and the flatbed transparent layer 123, the slider 14 in contact with the rollers 121 will be moved by mean of rolling. Similarly, during the movement in the adverse direction, the slider 14 will also be moved by mean of rolling. In other words, the rollers 121 roll and rotate for the slider 14 of the instant disclosure to pass through. Nevertheless, the bridge structure (such as the bridge plate) of the prior arts passes through the rollers 121 through sliding. Therefore, after prolong usage, the typical bridge structures and the sliders may be easily damaged due to abrasion. Conversely, the contacting method between the bridge structure and the slider of the instant disclosure has been improved to lengthen the lifespan of the detecting device. To provide further explanations, the glide plane 146 of the slider 14 has been polished intensively to increase the smoothness thereof. In addition, the slider 14 can be made of Teflon (POM+10% PTEE, where POM refers to Polyoxymethylene, and PTEE refers to Polytetrafluoroethene) which is of high lubricity and high wear-resistance. Thus, by utilizing the POM as the material for the slider 14 of the instant disclosure, a longer endurance can be provided when the slider 14 passes through the rollers 121 by mean of rolling.

Figure 5:
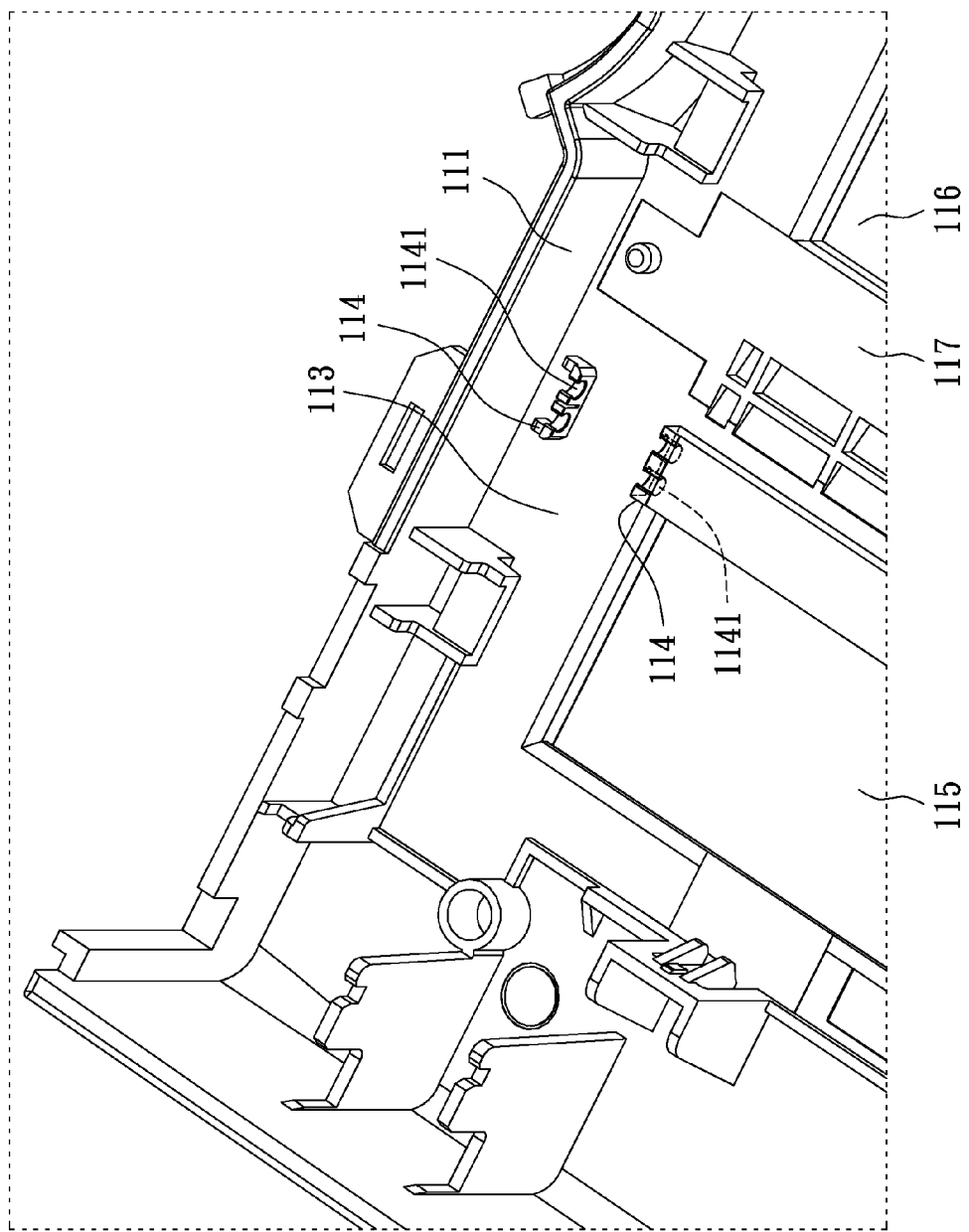
FIG. 5 shows a three-dimensional view of the interior housing of a detecting device having image capturing capability in a bridge structure, in accordance to the instant disclosure, before the roller is mounted thereon.
Figure 6:
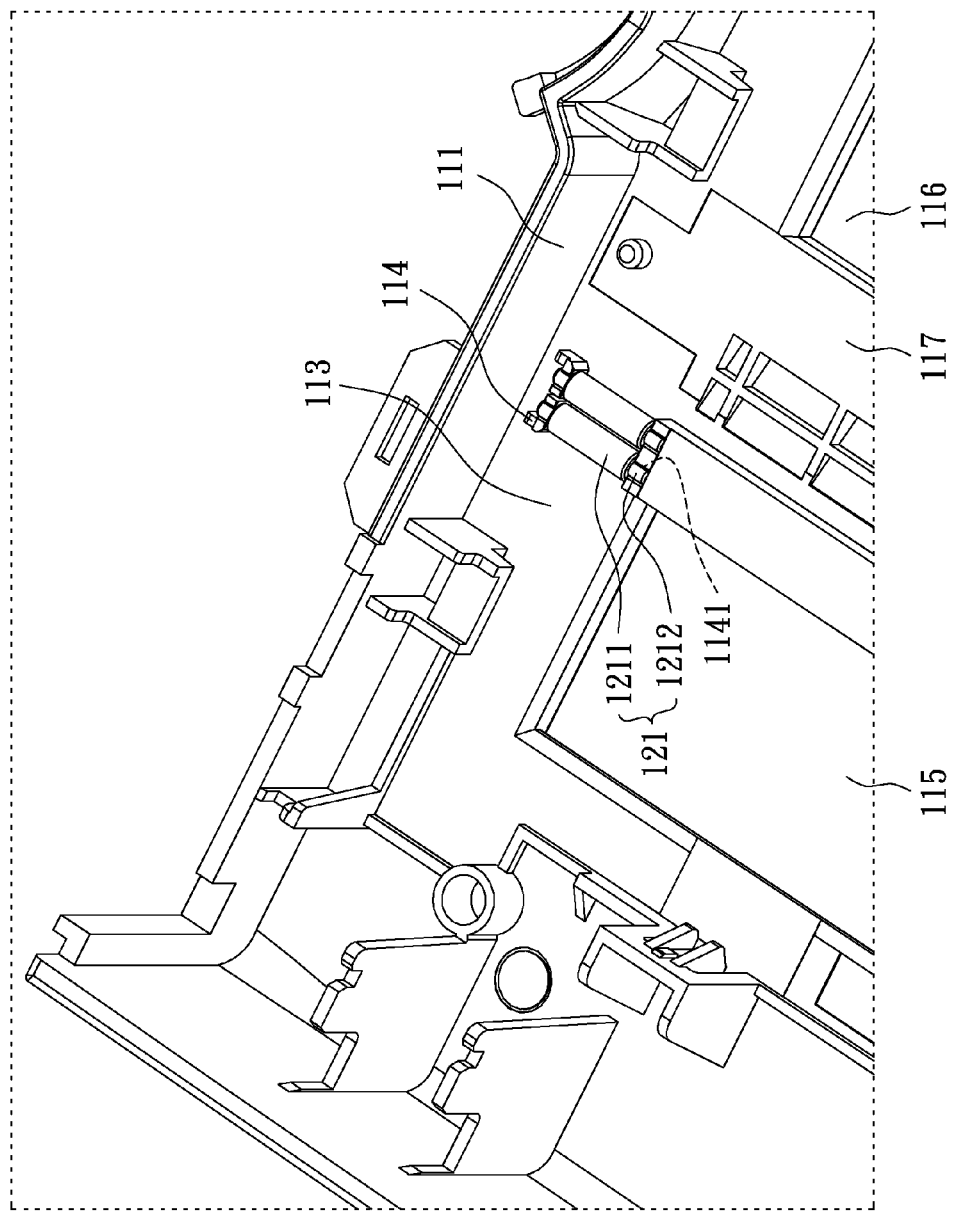
FIG. 6 shows a three-dimensional view of the interior housing of a detecting device having image capturing capability in a bridge structure, in accordance to the instant disclosure, after the roller is mounted thereon.

Please refer to FIGS. 5-6 along with FIG. 2. For the instant embodiment, the cover 111 includes at least one retainer 114 arranged on the inner walls 113 between the ADF window 115 and the flatbed window 116. The retainer 114 defines two relative retaining notches 1141 (shown in FIG. 5) thereon. The two relative sides of the rollers 121 are pivoted on the retaining notches 1141 of the retainer 114. The rollers 121 of the instant disclosure include an inner shaft 1211 and two outspread shafts 1212, where the two outspread shafts 1212 extend externally from the two ends of the inner shaft 1211. The two outspread shafts 1212 are pivoted on the retainer 114 (shown in FIG. 6) in a mating shape of the retaining notches 1141.

To provide further explanations, the housing 11 of the instant disclosure can be made of plastic materials (such as ABS, HIPS, etc.). In addition, in order to increase the swiftness of the rotational behavior of the rollers 121, lubricants or drying oil can be utilized for lubrication between the rollers 121 and the retainer 114 to increase the service life thereof. Moreover, the method of coating can also be utilized to increase lubricity. Furthermore, the drying oil can be composed of the 2,3-Dihydrodecafluoropentane, the Poly-TFE (PTFE) and the Omega-Hydro-Alpha-(Methylcyclohexyl).

Figure 7:
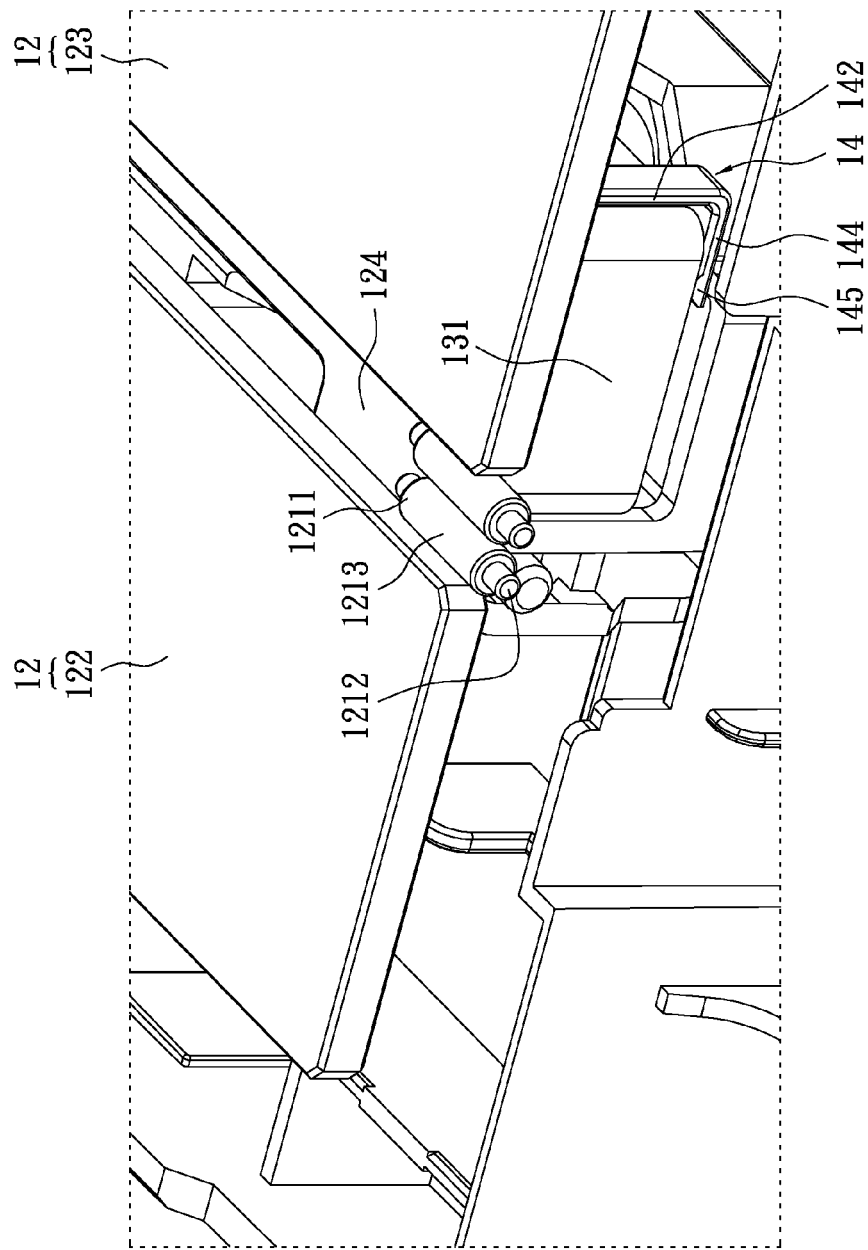
FIG. 7 shows a three-dimensional view of the interior housing of a detecting device having image capturing capability in a bridge structure, in accordance to the instant disclosure from another angle, after the roller is mounted thereon.

Please refer to FIG. 7 along with FIG. 2. The inner shaft 1211 has a cylindrical surface 1213, where a predetermined distance is kept between the cylindrical surface 1213 and the cover 111. In other words, when the rollers 121 rotate in an axial manner, the cylindrical surface 1213 of the inner shaft 1211 stays clear from contacting the inner walls 113 of the cover 111 to produce friction. However, the cylindrical surface 1213 will get in contact with the slider 14 partially. In the instant embodiment, the retainer 114 and the housing 11 are of separate and detachable components. Alternatively, they can be of an integrated one piece design. The exact implementation thereof shall not be limited to the exemplary embodiment disclosed herein.

Figure 8:
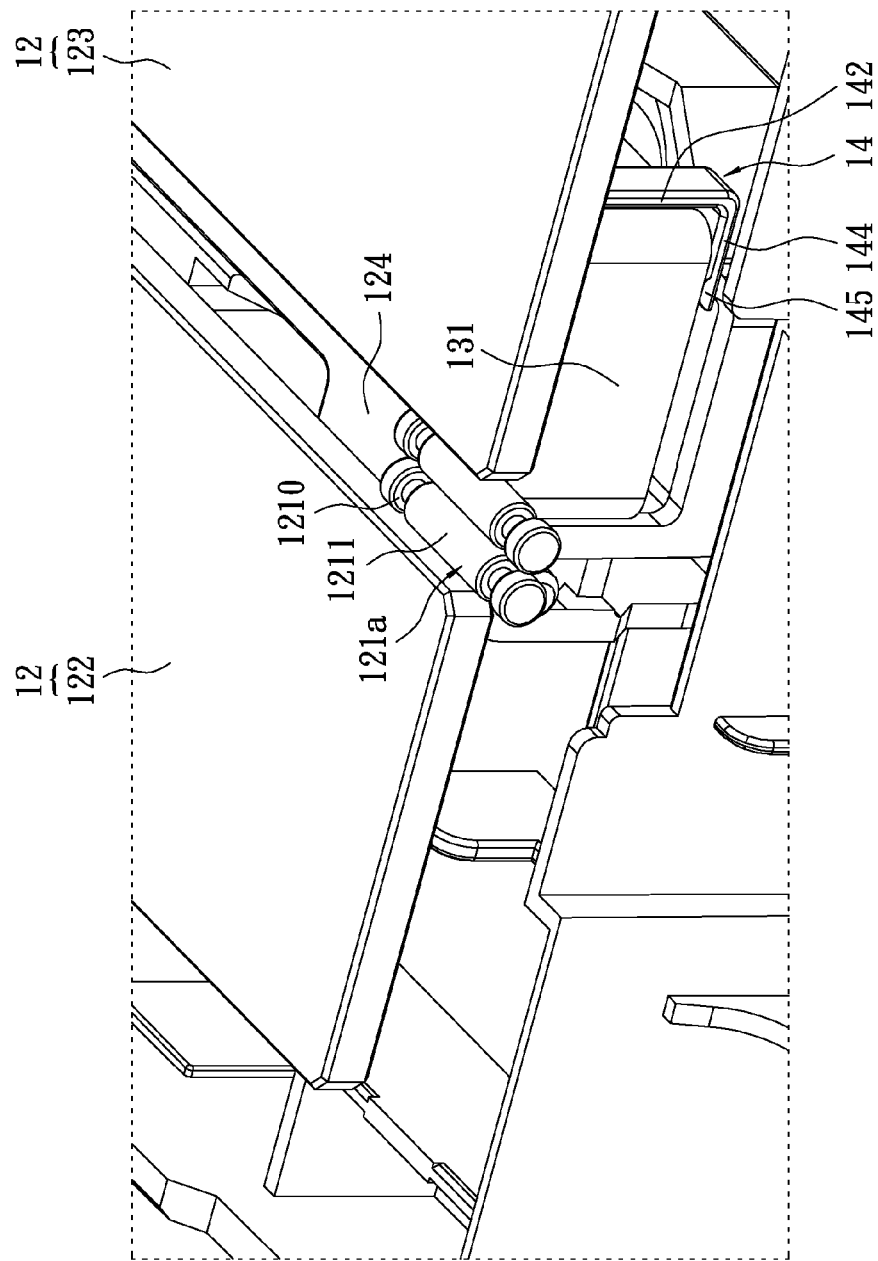
FIG. 8 shows a three-dimensional view of a detecting device having image capturing capability in a bridge structure, according to another embodiment of the instant disclosure.

Additionally, the method of disposing the rollers 121 on the cover 111 is not restricted thereto. The rollers 121 can also be pivoted directly on the retainer 114 through the two relative sides of the inner shaft 1211. As shown in FIG. 8, two annular slots 1210 are defined on the two respective ends of the inner shaft 1211 of the roller 121a for pivoting the roller 121a in the retainer 114.

Please refer to FIGS. 3-4. The scanning module 13 includes an image sensing unit 131 and a base support 132. A linear spring (not shown) on top of the base support 132 is utilized to support the image sensing unit 131, and a transmission mechanism composed of transmission bearings is arranged under the base support 132 to drive the scanning module 13. The slider 14 is arranged on the image sensing unit 131. The image sensing unit 131 includes at least one trough 1311 which has a mating shape with the first extended portion 143 for the insertion thereof. For example, the instant disclosure utilizes two first extended portions 143. However, the exact implementation shall not be restricted to that of the exemplary embodiment provided herein. The image sensing unit 131 is clamped by the first portion 141 and the second extended portion 144. The nail portion 145 abuts against the lower surface of the image sensing unit 131.

Please note, the directional terms mentioned in the instant disclosure such as: top, bottom, left, right, front, and back are only references for the attached figures. Therefore, the directional terms are merely for explanation purposes and are not intended to restrict the instant disclosure.

Based on the above, the instant disclosure relates to an image detecting/capturing device having an improved bridge structure. The ADF transparent layer and the flatbed transparent layer have rollers mounted therebetween. The rollers rotate swiftly to ensure a smooth operation of the scanning module between the ADF transparent layer and the flatbed transparent layer. Furthermore, the slider is moved by the rotation of the rollers which has well replaced the typical sliding manner. Thereby, decreasing frictional resistance to reduce damages to the slider from abrasion. Therefore, the service life of the detecting device can be increased significantly, and the quality of the graphics can be maintained in a better condition. On the other hand, in comparison to conventional bridge plates, the inclusion of the rollers can simplify the structural design of the detecting device to reduce the manufacturing cost.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A detecting device having image capturing capability in a bridge structure, comprising:
    a housing having a plurality of inner walls;
    a bridge structure, including:
        at least one roller mounted on at least one of the inner walls of the housing;
        an automatic document feeding (ADF) transparent layer;
        a flatbed transparent layer, wherein the roller is arranged between the ADF transparent layer and the flatbed transparent layer;
    a scanning module movably arranged below the ADF transparent layer and the flatbed transparent layer, and the scanning module is spaced apart from the roller; and
    a slider arranged on the scanning module, wherein the slider has a glide plane arranged proximate to the ADF transparent layer and the flatbed transparent layer, wherein the roller can roll on the glide plane.

2. The detecting device having image capturing capability in a bridge structure according to claim 1, wherein the housing has a cover and a base, and wherein the cover includes a retainer, the roller includes an inner shaft, and two annular slots are defined on the two respective ends of the inner shaft of the roller for pivoting the roller in the retainer.

3. The detecting device having image capturing capability in a bridge structure according to claim 2, wherein the roller further includes two outspread shafts extending externally from the two ends of the inner shaft, and wherein the two outspread shafts are pivoted on the retainer.

4. The detecting device having image capturing capability in a bridge structure according to claim 3, wherein the inner shaft has a cylindrical surface, and a predetermined distance is kept between the cylindrical surface and the cover.

5. The detecting device having image capturing capability in a bridge structure according to claim 2, wherein the retainer and the housing can be of integrated one piece construction or of detachable composite arrangement.

6. The detecting device having image capturing capability in a bridge structure according to claim 1, wherein the scanning module includes an image sensing unit and a base support, wherein the base support supports the image sensing unit, and the slider is arranged on the image sensing unit.

7. The detecting device having image capturing capability in a bridge structure according to claim 6, wherein the slider has a first portion and a second portion, wherein the first and the second portions are connected in their respective ends, and the slider is substantially an L-shaped structure, the first portion has at least one first extended portion which extends to form in the direction away from the rollers, one end of the second portion has a second extended portion extended therefrom, where the second extended portion is arranged in parallel with respect to the first portion, and one distal end of the second extended portion has a nail portion arranged thereon, wherein the nail portion is extendedly formed in the direction facing the first portion 141.

8. The detecting device having image capturing capability in a bridge structure according to claim 7, wherein the image sensing unit includes at least one trough which has a mating shape with the first extended portion for the insertion thereof.

9. The detecting device having image capturing capability in a bridge structure according to claim 1, wherein the housing has a ADF window, and a flatbed window, where they are spaced apart by a dividing portion arranged there-between, wherein the ADF window is in correspondence with the ADF transparent layer, and the flatbed window is in correspondence with the flatbed transparent layer.

10. The detecting device having image capturing capability in a bridge structure according to claim 1, wherein a predetermined distance is kept between the roller and the ADF transparent layer, and the flatbed transparent layer respectively.

\* \* \* \* \*